US011233692B2

(12) United States Patent
Narayanan et al.

(10) Patent No.: US 11,233,692 B2
(45) Date of Patent: Jan. 25, 2022

(54) OUT-OF-BAND-MANAGEMENT SYSTEMS AND METHODS FOR INTEGRATED SERIAL CONSOLE AND ETHERNET ACCESS

(71) Applicant: DELL PRODUCTS L.P., Round Rock, TX (US)

(72) Inventors: Padmanabhan Narayanan, Redmond, WA (US); Anandaraj Maharajan, Woodinville, WA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/824,303

(22) Filed: Mar. 19, 2020

(65) Prior Publication Data

US 2021/0297304 A1 Sep. 23, 2021

(51) Int. Cl.
| H04L 12/24 | (2006.01) |
| H04L 12/46 | (2006.01) |
| H04L 12/931 | (2013.01) |
| H04L 29/12 | (2006.01) |
| H04L 12/40 | (2006.01) |
| H04L 29/06 | (2006.01) |

(52) U.S. Cl.
CPC ........ *H04L 41/04* (2013.01); *H04L 12/40045* (2013.01); *H04L 12/4625* (2013.01); *H04L 12/4645* (2013.01); *H04L 41/0213* (2013.01); *H04L 49/352* (2013.01); *H04L 61/2015* (2013.01); *H04L 63/18* (2013.01)

(58) Field of Classification Search
None
See application file for complete search history.

(56) References Cited

U.S. PATENT DOCUMENTS

| 2003/0101239 A1* | 5/2003 | Ishizaki | H04L 12/4679 |
| | | | 709/219 |
| 2008/0072291 A1* | 3/2008 | Carley | H04L 63/20 |
| | | | 726/3 |
| 2014/0204955 A1* | 7/2014 | Kelly | H04J 3/26 |
| | | | 370/401 |
| 2014/0362859 A1* | 12/2014 | Addanki | H04L 12/4641 |
| | | | 370/392 |
| 2017/0244640 A1* | 8/2017 | Lin | H04L 67/1004 |
| 2021/0044563 A1* | 2/2021 | Reyes | H04L 63/029 |

OTHER PUBLICATIONS

G Rieger "socat(1)—Linux man page" [online], [Retrieved Oct. 14, 2020], Retrieved from Internet <URL:https://linux.die.net/man/1/socat> (28pgs).

* cited by examiner

*Primary Examiner* — Joshua Joo
(74) *Attorney, Agent, or Firm* — North Weber & Baugh LLP

(57) ABSTRACT

A bidirectional out-of-band management (OOBM) dongle comprises a serial port for receiving console traffic from a console port of a managed switch and an Ethernet port for receiving management port traffic from a management port of the managed switch. In operation, the OOBM dongle multiplexes, via an optional adapter, the console traffic and the management port traffic and generates Ethernet traffic that is then communicated, via an OOBM port on the dongle, to an OOBM switch port of an OOBM switch that acts as a power sourcing device for the OOBM dongle.

14 Claims, 12 Drawing Sheets

500

505: IN RESPONSE TO OBTAINING, AT AN ETHERNET PORT OF AN OOBM DONGLE, WHICH COMPRISES AN OOBM PORT, MANAGEMENT PORT TRAFFIC FROM A MANAGED SWITCH, WHICH COMPRISES A MANAGEMENT ETHERNET PORT, SWITCH THE TRAFFIC ON AN UNTAGGED VLAN TO THE OOBM PORT TOWARDS AN OOBM SWITCH

510: IN RESPONSE TO RECEIVING MANAGEMENT PORT TRAFFIC FROM THE OOBM PORT, SWITCH THE TRAFFIC TO THE ETHERNET PORT OF THE OOBM DONGLE TOWARDS THE MANAGEMENT ETHERNET PORT OF THE MANAGED SWITCH

FIG. 5

OUT-OF-BAND-MANAGEMENT SYSTEMS AND METHODS FOR INTEGRATED SERIAL CONSOLE AND ETHERNET ACCESS

BACKGROUND

The present disclosure relates generally to information handling systems and methods. More particularly, the present disclosure relates to out-of-band-management (OOBM) systems and methods for integrating the console and management ports of a managed switch.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The current practice of managing OOBM ports for console and Ethernet traffic on managed switched by using two different networks is cumbersome and relatively inefficient. Certain approaches that have attempted to provide a remedy utilize processors that provide Serial-Over-LAN (SOL) access. However, such approaches have several shortcomings, including the need to setup and manage a DHCP server as part of the management network and distribute assigned SOL IP addresses. More importantly, not all existing switches support SOL in hardware.

Accordingly, it is highly desirable to find new, efficient systems and methods for accessing OOBM ports to perform console and Ethernet management using unified management server ports on OOBM switches to handle reach both console and management traffic.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

FIG. 5 is a flowchart illustrating Ethernet port traffic processing according to embodiments of the present disclosure.

DETAILED DESCRIPTION OF THE PREFERRED EMBODIMENTS

Figure 1A:
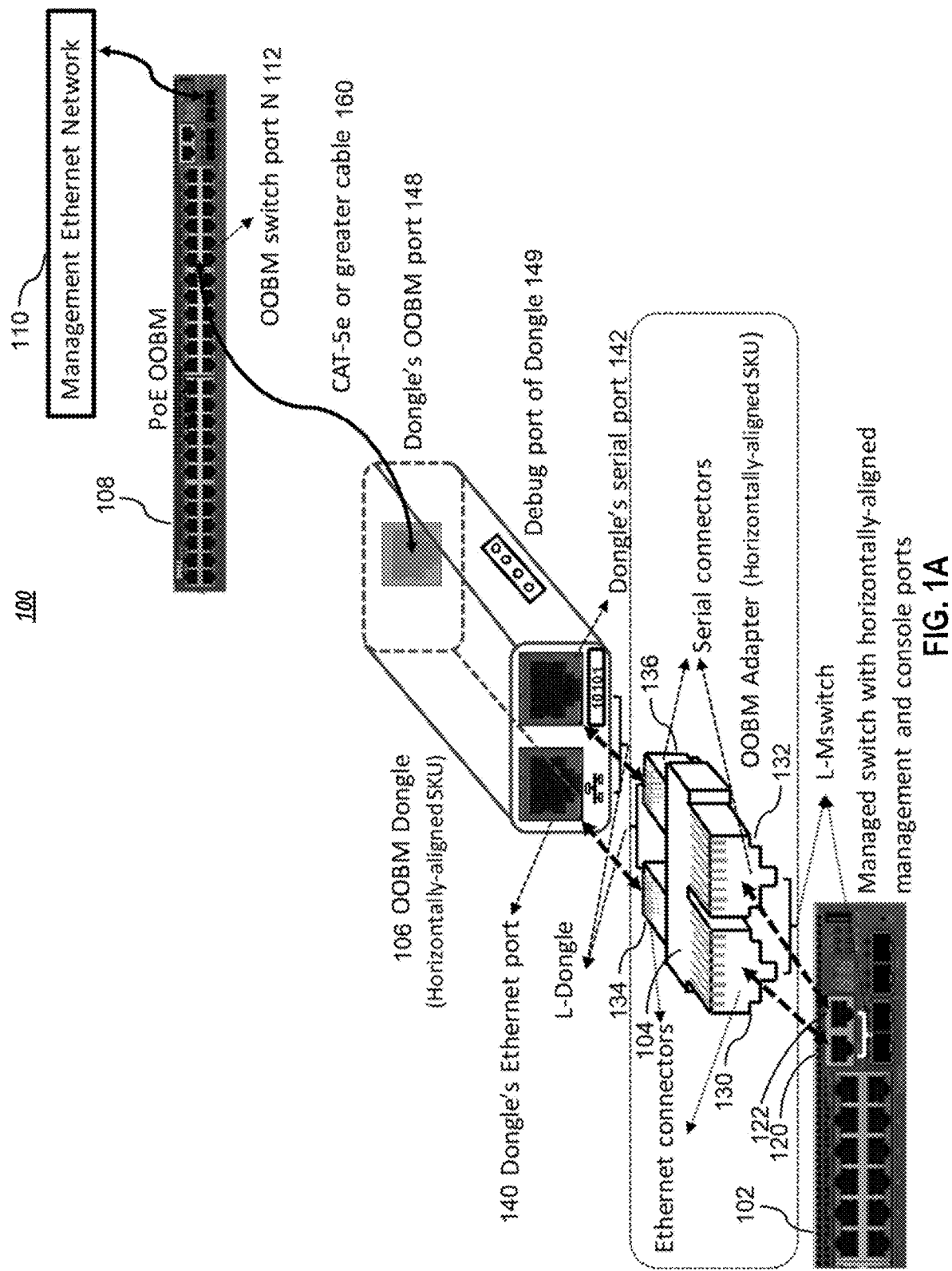
FIG. 1A depicts an exemplary network comprising a network comprising an OOBM dongle and matching adapter combination having horizontally aligned ports according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

Any headings used herein are for organizational purposes only and shall not be used to limit the scope of the description or the claims. Each reference/document mentioned in this patent document is incorporated by reference herein in its entirety.

It is noted that although embodiments described herein may be within the context of certain connectors and ports, aspects of the present disclosure are not so limited. While the disclosure mainly discusses for both the console and the management port RJ45 jacks, it is understood that any type of connector or port, e.g., micro-USB consoles and other designs, may equally benefit from the teachings of the present disclosure. Accordingly, the aspects of the present disclosure may be applied or adapted for use in other contexts.

In this document, the terms "managed switch port" and "management switch port," "management port" are used interchangeably. Similarly, "PoE OOBM switch" and "OOBM switch," are used interchangeably. "OOBM switch port" refers to the port of a OOBM switch.

FIG. 1A depicts an exemplary network comprising a network comprising an OOBM dongle and matching adapter that has horizontally aligned ports according to embodiments of the present disclosure. Network 100 in FIG. 1A comprises OOBM dongle 106 designed to provide connectivity between POE OOBM switch 108 and managed switch 102. In embodiments, dongle 106 comprises Ethernet port 140, serial port 142, and OOBM port 148 (here a RJ45 port) that is designed to couple to OOBM switch port 112 on POE OOBM switch 108. Switch 108, in turn, may be coupled to management and Ethernet network 110. In embodiments, OOBM dongle 106 may further comprise debug port 149 that, in operation, may be used to debug software running on OOBM dongle 108. It is noted that while a 4-pin connector is shown at port 149, this is not intended as a limitation on the scope of the invention as any type of debugging connection and mechanism known in the art may be used. As an example, port 149 may or may not support a ground connection.

Managed switch 102 comprises management port 120 and console port 122 that may be co-located either on the front-end of managed switch 102 (here, next to eight other front-end ports) or on the back of managed switch 102, and may be connected to an ASIC (not shown).

Figure 1B:
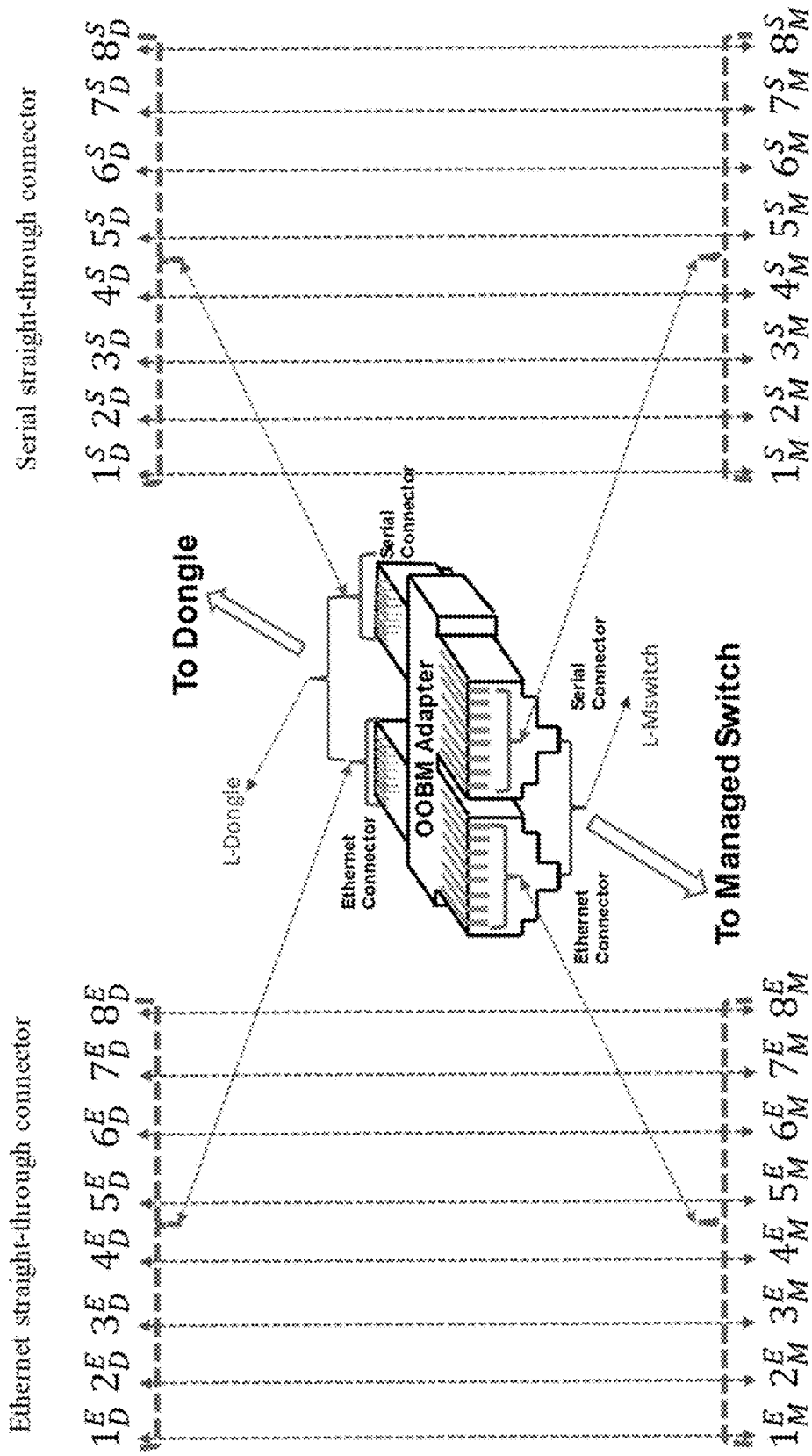
FIG. 1B depicts an exemplary OOBM adapter and its internal connections according to embodiments of the present disclosure.

OOBM adapter 104 is an optional device that may be used to connect OOBM dongle 106 to managed switch 102. Exemplary mapping of internal connections for OOBM adapter 104 are depicted in FIG. 1B, which illustrates adapter 104 in an implementation that has a one-to-one wire connectivity in which adapter 104 acts as a passthrough device. "E" in FIG. 1B refers to Ethernet, "S" refers to console, "M" refers to the side the adapter that, in operation, faces the managed switch, and "D" refers to the side the adapter that in operation faces the OOBM dongle. Exemplary connection $7_D^E$ denotes the 7th pin of the Ethernet connector (e.g., 134 in FIG. 1A) that attaches to the 7th pin of the dongle's Ethernet port (e.g., 140 in FIG. 1A); $7_M^E$ denotes the 7th pin of the Ethernet port (e.g., 130 in FIG. 1A) that attaches to the 7th pin of the managed switch's management port (e.g., 120 in FIG. 1A); $7_D^S$ denotes the 7th pin of the serial connector (e.g., 136 in FIG. 1A) attaching to the 7th pin of the dongle's serial port (e.g., 142 in FIG. 1A); and $7_M^S$ denotes the 7th pin of the serial connector (e.g., 132 in FIG. 1A) attaching to the 7th pin of the Managed switch's console port (e.g., 122 in FIG. 1A).

In embodiments, ports 130 and 132 of OOBM adapter 104 are designed to connect to respective management port 120 and console port 122 on managed switch 102. Connectors 134 and 136 of OOBM adapter 104 are designed to connect to respective Ethernet port 140 and serial port 142 (here RJ45 ports) on OOBM dongle 106.

In embodiments, management and console ports 120, 122 may be connected to respective ports 140, 142 on OOBM dongle 106 without utilizing OOBM adapter 104, e.g., by using Ethernet and/or console cables instead. However, since in implementations in which dongle 106 has a certain length (e.g., greater than 3") and/or a considerable cross section that may potentially obstruct air flow, e.g., when being suspended from a rack with no support, adapter 140 may be used to position dongle 106 in the same plane as management port 120 and console port 122, e.g., along the same axis prevent dongle 106 from negatively impacting cooling.

In embodiments, the distance (denoted as "L-Dongle" in FIG. 1A) between the midpoints of male connectors 134, 136 of adapter 104 that attach to OOBM dongle 106 may be fixed and substantially correspond to the distance between respectively jacks 140 and 142 of dongle 106. Since in practice, the length between male connectors 130, 132 that attach to managed switch ports 120, 122 may vary from one switch vendor to another, or even across different product lines of the same vendor, in embodiments, the distance (denoted as "L-Mswitch" in FIG. 1A) between the midpoints of connectors 130 and 132 of adapter 104 may be customized to match the dimensions of managed switch 102 to which adapter 104 is to mate.

Figure 2:
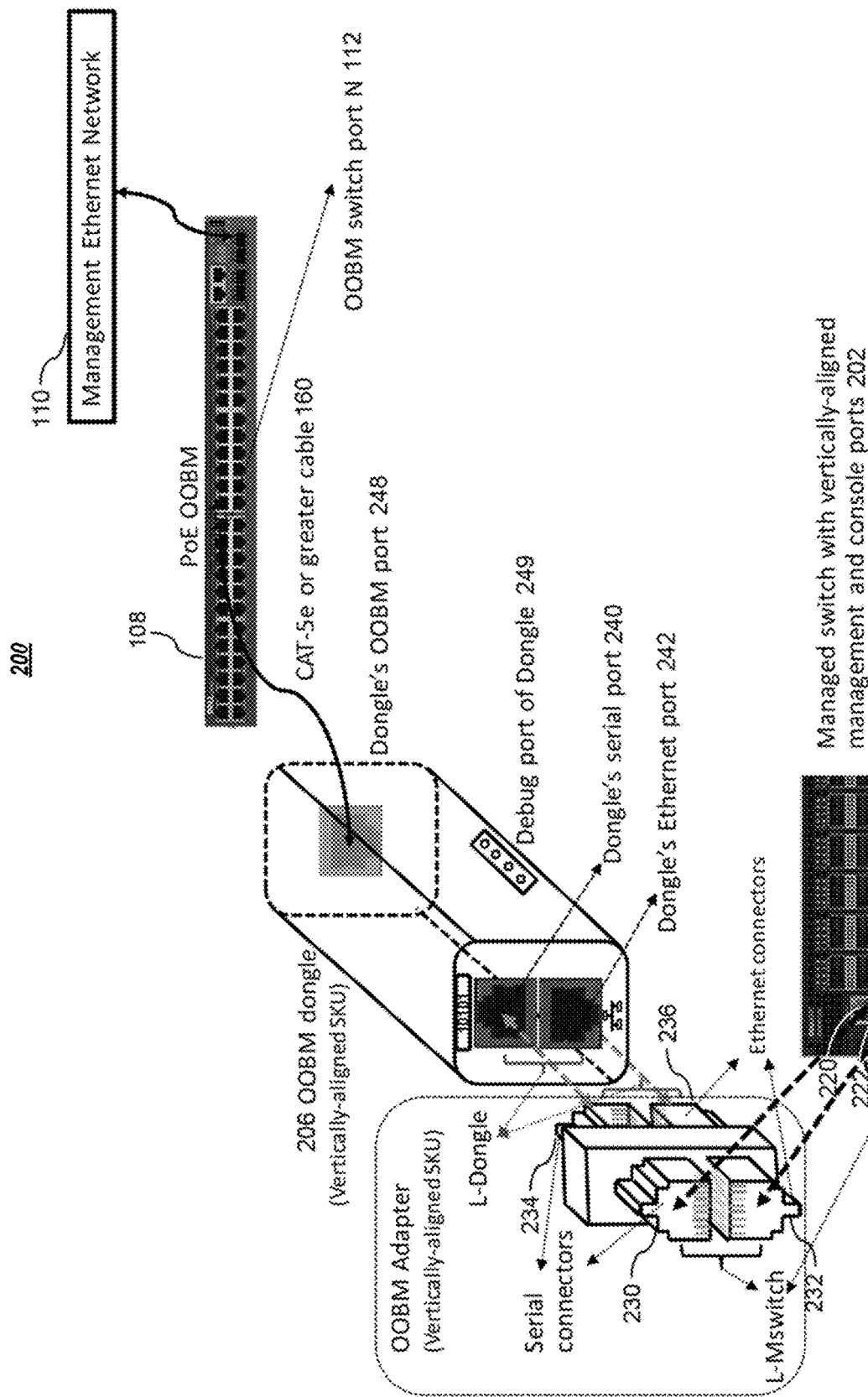
FIG. 2 depicts a network similar to that in FIG. 1A using vertically aligned ports according to embodiments of the present disclosure.

A dongle vendor may typically provide two L-Dongle values—one for horizontally-aligned dongles as shown in FIG. 1A and another L-Dongle value for a vertically-aligned dongles shown in FIG. 2. Assuming a user desired integrated management and console access for a horizontally-aligned managed switch 102 (e.g., from a particular switch vendor) and has bought horizontally-aligned OOBM dongle 106 from an OOBM dongle vendor, the user may obtain the L-Mswitch value (e.g., from the specification of managed switch 102) and the L-Dongle value (e.g., from the specification of OOBM dongle 106) to select an appropriate OOBM adapter having dimensions {L-Mswitch, L-Dongle}, i.e., L-Mswitch between the connectors on one side that will plug into managed switch 102 and L-Dongle on the opposite side that will plug into OOBM dongle 106. In embodiments, adapter 104 and/or dongle 106 may comprise a unique identifier such as a stock keeping unit (SKU) that simplifies matching dongle 106 with its intended adapter (e.g., 104) and vice versa. It is understood that many SKUs may exist for any combination of possible {L-Mswitch, L-Dongle} values.

In embodiments, connectors 134, 136 of adapter 104 may be designed to extend into dongle 106 by a certain length to support the weight of dongle 106 and, e.g., cabling attached thereto. In embodiments, one or more different or additional supporting structures may be used to support dongle 106, for example, in a manner such that dongle 106 can securely attached to a rack (not shown).

Ports 120, 122 of managed switch 102 may be aligned horizontally or vertically. In embodiments, if ports 120, 122 are aligned horizontally, i.e., along a common horizontal axis as shown in FIG. 1A, a horizontally aligned OOBM adapter 104 may mate to ports 120, 122 to which a horizontally aligned OOBM dongle 106 may be attached. Conversely, if managed switch ports 120, 122 are aligned vertically as shown in FIG. 2, a vertically aligned OOBM adapter 204 may mate to managed switch ports 220, 222 to which a vertically aligned OOBM dongle 206 may mate.

It is noted that RJ45 ports are depicted only for purposes of illustration. While for both management port 120 and console port 122 the disclosure discusses mainly RJ45 jacks, which have become the de-facto standard in the art, the disclosure is not intended to be limited to any type of connector or port design as other designs may equally be used in line with the teachings of the present disclosure. It further noted that in certain instances, management port 120 and console port 122 may be juxtaposed with respect to the ports of dongle 106. Therefore, in embodiments, adapter 104 may be implemented as a crossover adapter.

In operation, once OOBM port 148 is plugged into OOBM switch port 112 of POE OOBM switch 108, e.g., via Ethernet cable 160, and ports 140, 142 of dongle 106 are connected to Ethernet port 120 and console port 122 of managed switch 102, e.g., via ports 130-136 of OOBM adapter 104, this enables OOBM dongle 106 to multiplex signals that dongle 106 receives from Ethernet and console ports 120, 122 onto OOBM port 148 and provide the result to OOBM switch port 112.

In embodiments, each OOBM 120, 122, 148 port may handle OOBM traffic, e.g., by using a relatively low speed serial protocol and CLI commands. A user may, for example, utilize a serial RS232 connection to access console port 122 to access a BIOS. Console port 122 may be coupled to a reverse telnet session on OOBM switch 108 that may act as the console server. The user may further use the Ethernet connectivity of management Ethernet port 120, typically a 1G or 10G port running a 802.3 Ethernet protocol and having an IP address that can be reached by using a telnet session, to facilitate queries and use SNMP or other network management protocols to remotely manage an Ethernet switch using OOBM. In embodiments, management port 120 may be linked to a management network switch, such as OOBM switch 108, and uplinked to management network 110. In embodiments, console characters from Ethernet port traffic received at OOBM switch port 112 may be demultiplexed, and a reverse telnet session may be established to console port 122 by connecting to OOBM switch port 112.

Dongle 106, in essence, is a bump-in-the-wire design that consolidates management port 120 and console port 122 respective for management traffic and console server traffic into a single uplink switch 108, by multiplexing traffic from both console port 122 and management port 120 connections of managed switch 102 into a single Ethernet port 112 on PoE OOBM switch 108. This allows a user to access both console port 122 and management port 120 by accessing a single OOBM switch port 112, e.g., using reverse telnet, and without having to handle two different types of network connectivity. As a result, multiplexing different types of traffic facilitates the ease of configuration and control of management port 120 and console port 122.

In embodiments, OOBM port 148 is power-over-Ethernet (PoE) capable such that when OOBM port 148 is connected to OOBM switch port 112 on PoE OOBM switch 108, e.g., a 802.1af PoE port that may act as a power sourcing equipment, dongle 106 becomes a powered device. Advantageously, this eliminates the need to energize dongle 106 by using additional power lines that, in addition to increasing installation cost, may obstruct airflow, etc. Reducing cabling and cable clutter by a significant amount further improves rack space use, e.g., in favor of providing increased computing space.

FIG. 2 depicts a network comprising an OOBM dongle and a matching adapter with vertically aligned ports according to embodiments of the present disclosure. Network 200 in FIG. 2 is similar to network 100 illustrated in FIG. 1A with the main difference that the ports on managed switch 202 and OOBM dongle 206 in FIG. 2 are aligned in a vertical position. For purposes of brevity, components similar to network 100 and their functions are not repeated here.

By managing both management port 220 and console port 222 of managed switch 202 using a single port 212 on OOBM switch 108, the disclosed systems and methods provide additional benefits comprising reducing cooling cost and eliminating the cost for, e.g., hundreds of feet of cable for each rack. Since managed switch 102 may be configured and/or controlled using a single NOS/touchpoint this "single-neck-to-choke" approach also simplifies installation, simplifies the configuration and management of both management port 220 and console port 222 by using dongle 206 as an integrated device.

Further, the presented cable-based solutions are vendor-neutral; agnostic to NOS/BIOS/ONIE/DIAG-OS software capabilities or other software running on a switch; and agnostic to processors and other hardware that may be embedded in the switch. Furthermore, the disclosed systems and methods may significantly reduce power consumption and operating cost.

Figure 3:
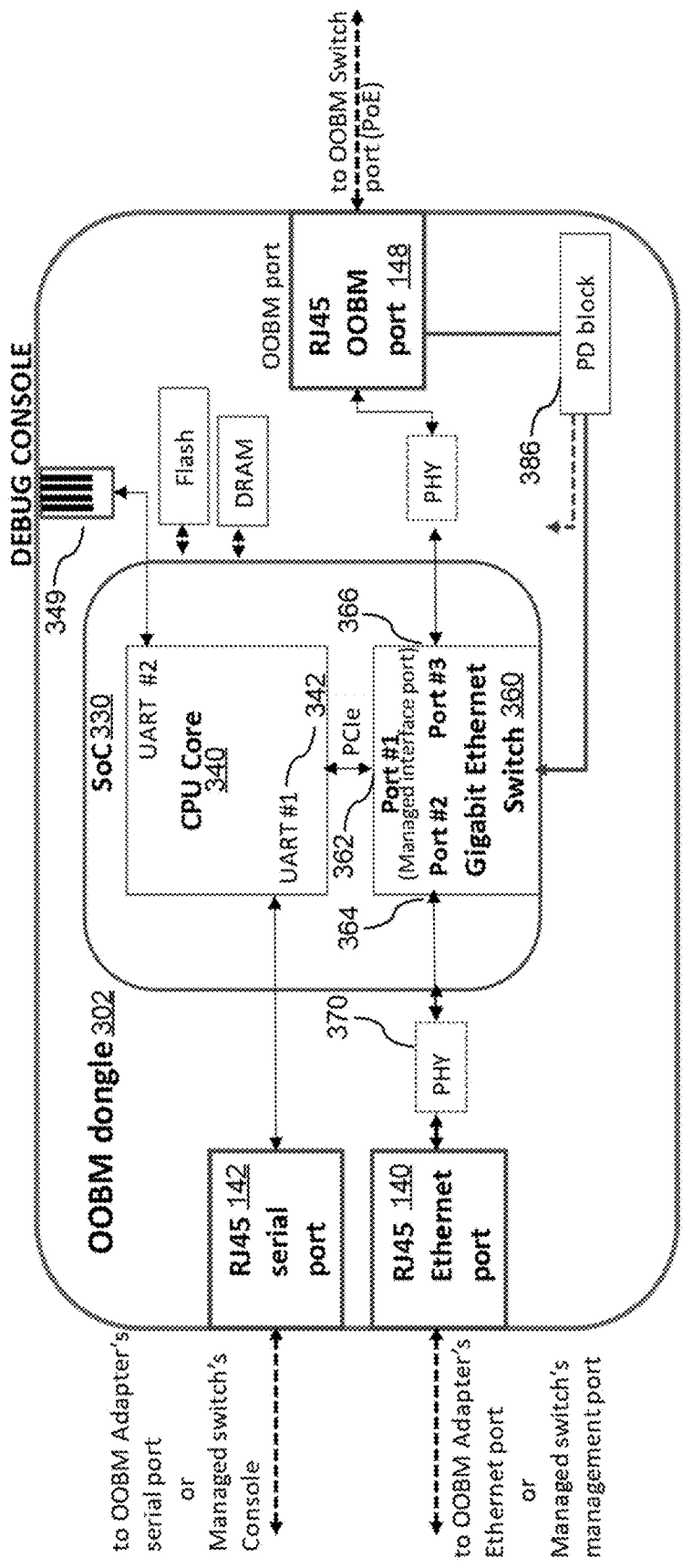
FIG. 3 depicts functional block of an OOBM dongle according to embodiments of the present disclosure.

FIG. 3 depicts functional block of an OOBM dongle according to embodiments of the present disclosure. Dongle 302 in diagram 300 comprises Ethernet port 140 and serial port 142 both depicted as RJ45 ports, OOBM port 148, system-on-chip (SoC) 330, which may further comprise core 340 and Gigabit Ethernet switch (GES) 360, debug console 349, powered device block 386, and PHY 370.

In embodiments, OOBM port 148 is PoE capable, such that once OOBM dongle 302 is connected to the PoE port of an OOBM switch (not shown in FIG. 3), the PoE port may energize dongle 302 and cause it to act as a class 1 powered device. Although 1G/full-duplex has become the management port standard, a PHY (e.g., 370) may be used, for example, to adjust to sub-1G speeds at either the managed switch end or the OOBM switch end of dongle 302.

As depicted in FIG. 3, GES 360 may be an integrated 3-port device (e.g., a MAC switch) that has a first port 362, e.g., a managed interface port that is internally managed by SoC 330. In embodiments, from the perspective of core 340, managed interface port 362 may be a PCIe Ethernet port that is used to configure GES 360. GES vendors typically provide a SDK/kernel driver that may be used to transmit and receive packets (Ethernet frames) over such an internal interface. In embodiments, GES 360 may detect Ethernet packets that are destined to the OOBM switch. A second port 364 of GES 360 may be configured to couple to Ethernet port 140, and third port 366 may be configured to couple to OOBM port 148.

In embodiments, GES 360 may be used to implement bump-in-the-wire management port throttling, e.g., in scenarios where a Gigabit Ethernet port of a switch does not support management port throttling to control the amount of Ethernet traffic. GES 360 may for example comprise a rule to drop packets if the rate of untagged packets ingressing on OOBM port 148 is equal or greater than, e.g., 1000 packets per second.

As depicted, SoC 330 comprises UART ports 342, 344. In embodiments, UART port 342 may be coupled to serial port 142 to establish primary console communication using the OOBM switch as the console server to terminate the reverse telnet console session and reformatting/packaging console traffic into Ethernet frames, and injecting the reformatted console traffic into PCIe port 362, as will be discussed in greater detail with reference to FIG. 4 through FIG. 7. A second UART port 344 may be used, e.g., to establish debugging of the operating system or an application of dongle 302 itself. In embodiments, scripts that may execute, e.g., CLI commands, can be downloaded and stored to SoC core 340 in lieu of having to access an external server. In embodiments, dongle 302 may enable buffering to facilitate the capturing of console logs, e.g., in scenarios where connectivity has been temporarily lost, or where no reverse telnet session has been established yet since no users has connected to the console yet.

In embodiments, Ethernet ports 140, 148 and GES 360 may operate at hardware speed or line rate with no significant delay, e.g., when performing multiplexing operations. In software implementations, various functions, such as encapsulation, decapsulation, and mapping, may take advantage of a hardware accelerator (not shown), which may be implemented, e.g., within CPU core 340.

Figure 4:
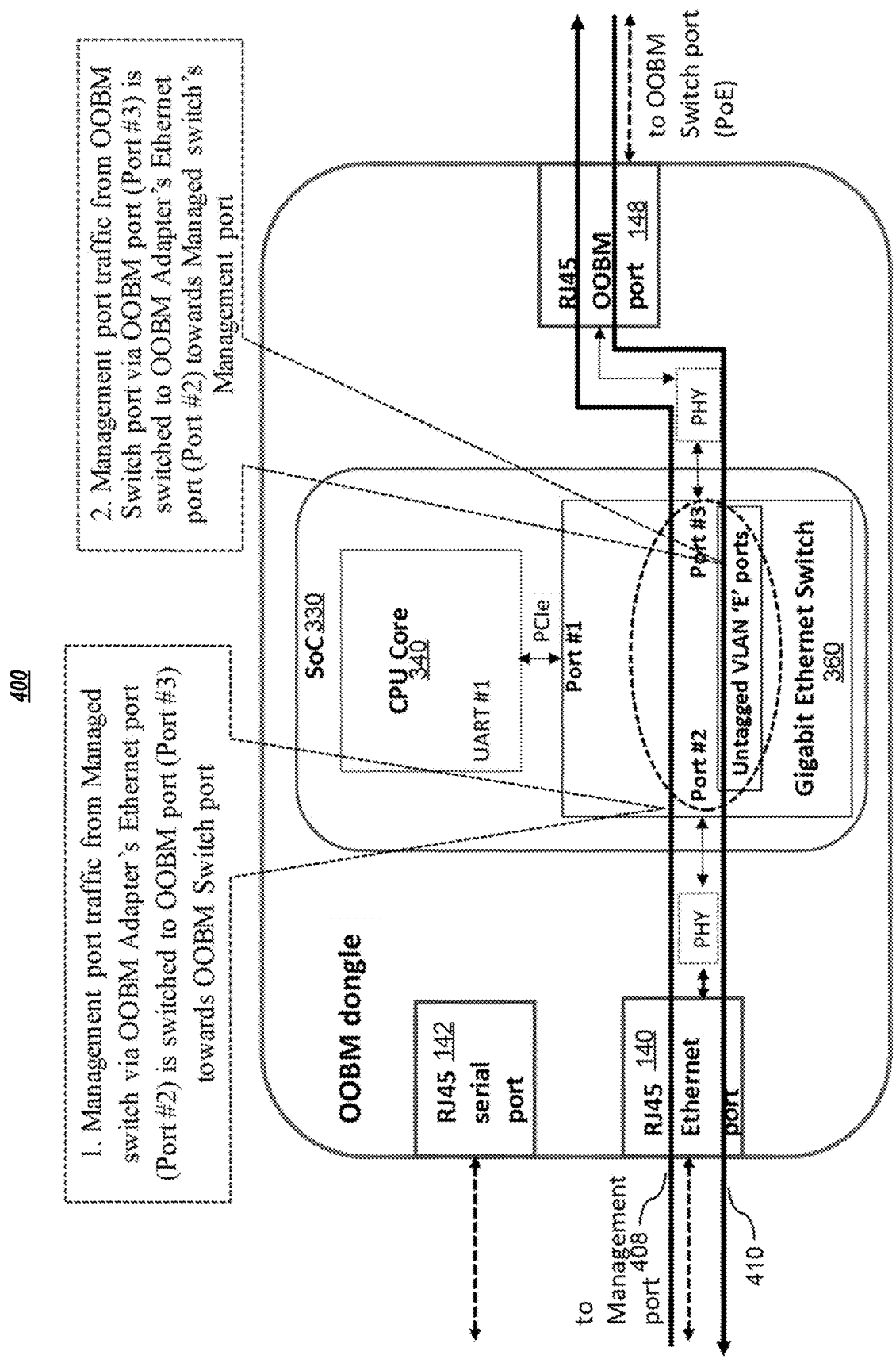
FIG. 4 depicts an exemplary flow of Ethernet port traffic through an OOBM dongle according to embodiments of the present disclosure.

FIG. 4 depicts an exemplary flow of Ethernet port traffic through an OOBM dongle according to embodiments of the present disclosure. In embodiments, management port traffic 408 ingresses on Ethernet port 140 of OOBM dongle 302. As mentioned previously, management port traffic 408 may have originated from a managed switch (not shown in FIG. 4).

In operation, in embodiments, management port traffic 408 is received by GES 360 at Ethernet interface 364 (labeled port #2 in FIG. 4). GES 360 may then switch the traffic, e.g., via interface 364 (labeled port #3) towards OOBM port 148 that may be coupled to an OOBM switch.

In embodiments, GES 360 switches management port traffic 408, e.g., on an untagged virtual local area network (VLAN) that in FIG. 4 is labeled VLAN 'E' (short for Ethernet). As depicted in FIG. 4, VLAN E comprises both ports 364 and port 366.

Conversely, in response to GES 360 receiving management port traffic 410 from OOBM port 148 that may have originated from an OOBM switch, management port traffic 410 may be switched to the Ethernet port 140, i.e., towards the management Ethernet port of the managed switch.

In short, interfaces 364 and 366 act as bridge ports that bridge Ethernet traffic between a managed switch port side of dongle 302 and a POE OOBM switch on the uplink port side of dongle 306.

FIG. 5 is a flowchart illustrating Ethernet port traffic processing according to embodiments of the present disclosure. In embodiments, process 500 begins when at an Ethernet port of an OOBM dongle, which comprises an OOBM port, management port traffic is obtained, e.g., from a managed switch that comprises a management Ethernet port. Once the management port traffic is obtained, it may be switched (505), e.g., on an untagged VLAN, towards an OOBM port that may be coupled to an OOBM switch.

In embodiments, in response to receiving management port traffic from the OOBM switch port, the management port traffic may be switched (510), e.g., on another untagged VLAN, to the Ethernet port of the OOBM dongle towards the management Ethernet port of the managed switch.

Figure 6:
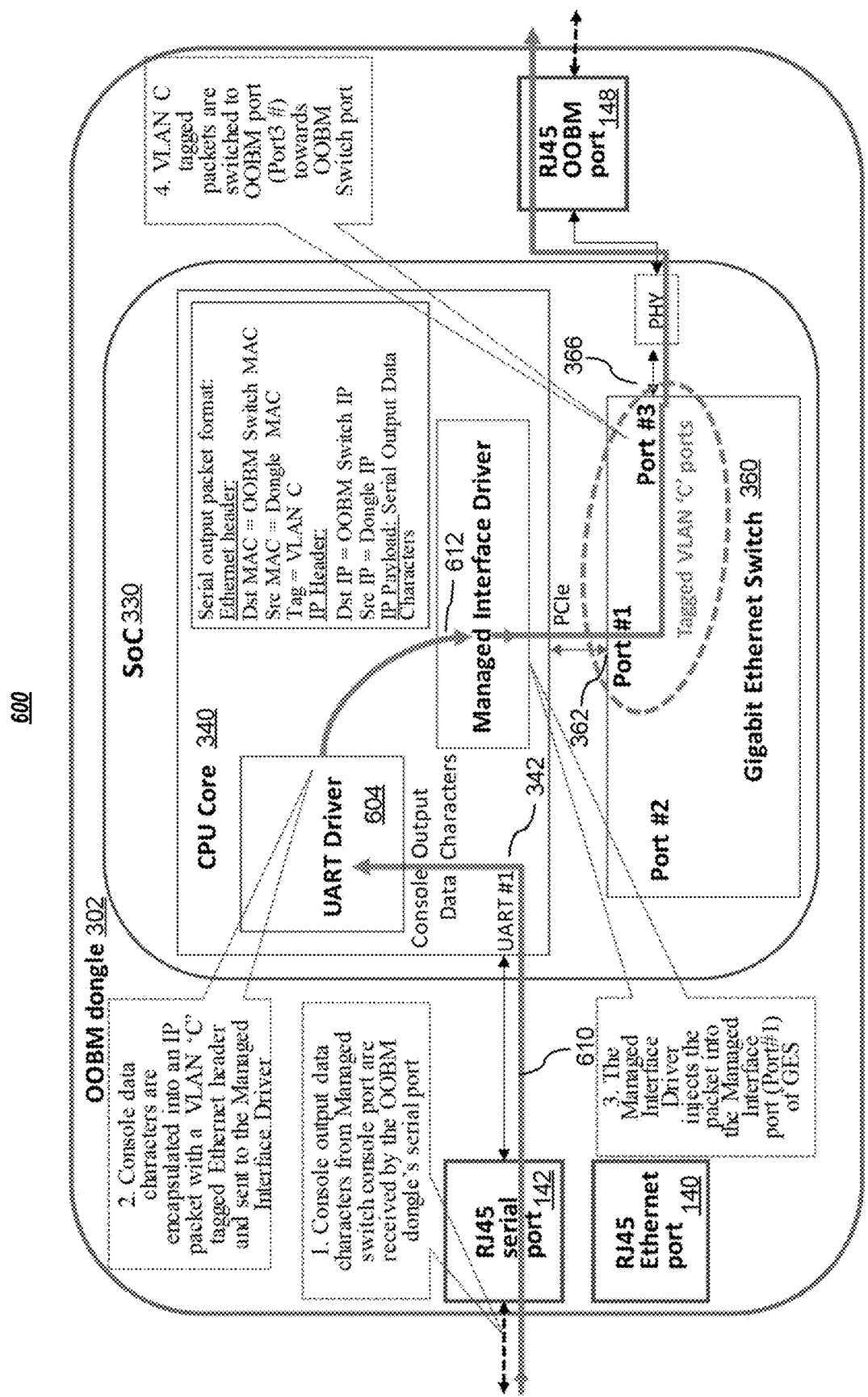
FIG. 6 depicts an exemplary console output traffic flow through an OOBM dongle according to embodiments of the present disclosure.

FIG. 6 depicts an exemplary console output traffic flow through an OOBM dongle according to embodiments of the present disclosure. In embodiments, exemplary dongle 302 comprises managed interface driver 602 and UART driver 604 that operate on CPU core 340 within SoC 330. In operation, console traffic 610 that may comprise console output data characters ingresses on serial port 142 of OOBM dongle 302 and is received at UART interface 342. In embodiments, SoC 330 may encapsulate the received characters 610 into VLAN-tagged packets or Ethernet frames 612. It is noted that encoding may involve any type of embedding, reformatting, packaging into an Ethernet frames, etc., known in the art. In example in FIG. 6, the format of a serial output packet may comprise an Ethernet header that (1) identifies the MAC address of an OOBM switch as the destination MAC address, (2) identifies the MAC address of dongle 302 as the source MAC address, and (3) tags the packet with a VLAN 'C' (short for Console) tag to obtain a VLAN C packet.

In embodiments, encapsulated data 612 may then be sent to managed interface driver 602 that, in response to receiving encapsulated packet 612, injects it into managed interface port 362 of three-port GES 360. In embodiments, VLAN C packet 612 may then be switched to OOBM port 148, via interface 366, e.g., toward an RJ45 OOBM switch port of an OOBM switch (not shown).

It is noted that processing console traffic 610 may comprise matching baud rates, e.g., by buffering console traffic 610, and other processing steps not discussed in detail. In embodiments, once the OOBM switch receives VLAN C packets (e.g., 612), it may identify them as console output and map them to a reverse telnet console session, e.g., to access the console of the managed switch. It is understood that, in embodiments, VLAN C packets may be assigned higher or lower priority than VLAN E frames on GES 360, e.g., based on user preference.

Figure 7:
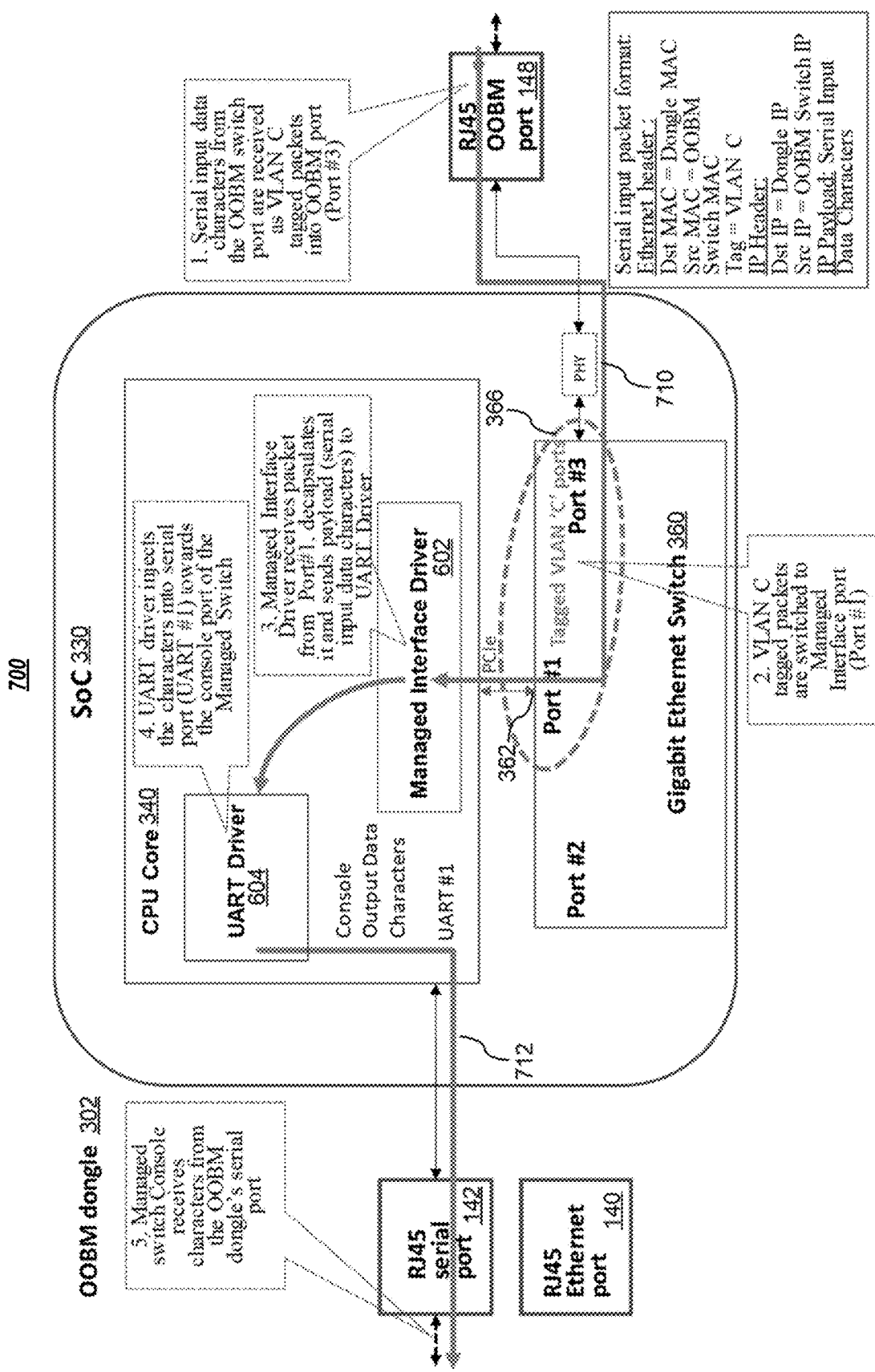
FIG. 7 depicts an exemplary console input traffic flow through an OOBM dongle according to embodiments of the present disclosure.

FIG. 7 depicts an exemplary console input traffic flow through an OOBM dongle comprising an exemplary 3-port GES according to embodiments of the present disclosure. In embodiments, SoC 330 that comprises GES 360 receives, e.g., via OOBM port 148, at Ethernet interface 366, such as port #3 in FIG. 3, VLAN C tagged console packet 710 that may comprise serial input data characters, for example, as a result of a user establishing a reverse telnet session and inputting via keystrokes the character at a CLI. The reverse telnet session may convert the character received at an OOBM switch to an Ethernet frame and feed the frame into an Ethernet port of the GES, e.g., as a VLAN C tagged console packet having as destination the MAC address of OOBM port 148 of dongle 302.

In embodiments, GES 360 may, e.g., according to a predetermined rule, lift VLAN C tagged packet 710 to managed interface driver 602, e.g., via internal PCIe link 362. In embodiments, managed interface driver 602 may decapsulate Ethernet frame 710 to extract the character and inject decapsulated frame 712 into serial port 142, e.g., via UART port 604, such that the character may be passed from serial port 142 to a RJ45 console port and eventually reach the console port of the managed switch. In embodiments, GES may further comprise a rule for bridging packets between port #3 to port #2, if those packets are untagged, i.e., without lifting Ethernet packets to CPU core 340. In embodiments, on both the OOBM dongle and the OOBM switch, bidirectional data transfer may be established using, e.g., the known socat function (at the software driver level) in combination with simple ingress/egress rules on the GES/MAC switch.

It is understood that VLAN C in FIG. 6 and FIG. 7, which comprises port 366, may also comprise port 362. However, this is not a requirement. It is further understood that, in embodiments, exemplary VLAN E and VLAN C may be hardcoded or assigned by using link layer discovery protocol options.

Figure 8:
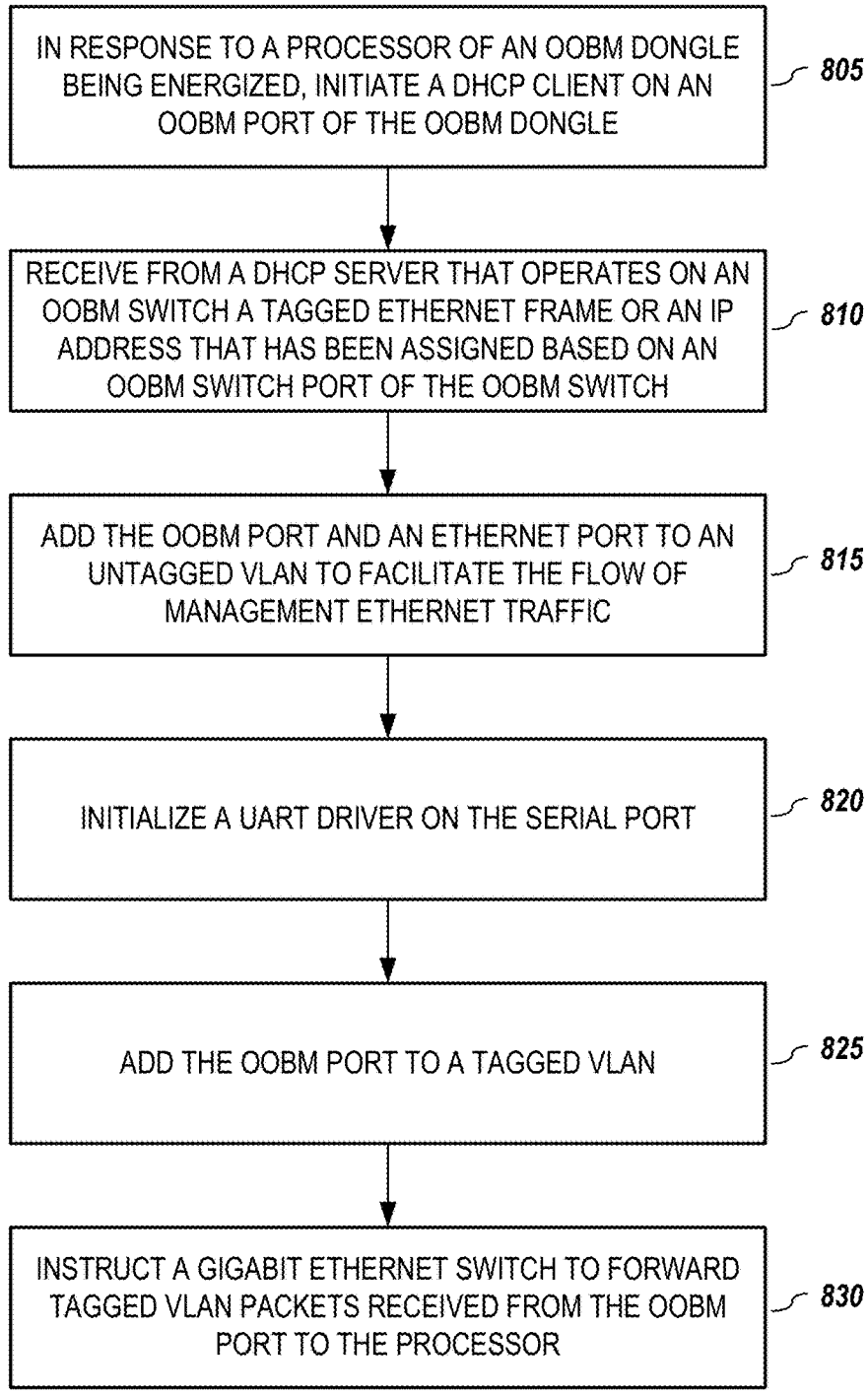
FIG. 8 is a flowchart illustrating an initialization sequence according to embodiments of the present disclosure.

FIG. 8 is a flowchart illustrating an initialization sequence according to embodiments of the present disclosure. In embodiments, once the SoC is energized and boots up, it may perform initialization sequence 800. In embodiments, SoC initialization sequence 800 may begin by initiating (805) a DHCP client on an OOBM port of an OOBM dongle, such as the uplink port denoted as OOBM port 148 in FIG. 1A.

Once the DHCP client starts, the SoC may optionally receive (810) an IP address from a DHCP server, such as local DHCP server that operates on an OOBM switch that is coupled to the OOBM port of the dongle. In embodiments, the DHCP server may assign a fixed IP address, e.g., based on the port of the OOBM switch. It is noted that such DHCP usage and IP address may be occur locally between the OOBM switch and the OOBM switch port. Configuring an IP address enables the OOBM switch to establish a telnet or SSH connection to the operating system running on the dongle, e.g., to facilitate dongle management or debugging operations, if desired. It is understood, however, without loss of generality, that the IP address assigned by the DHCP server may be replaced with tagged Ethernet frames, e.g., for transporting console traffic.

In embodiments, the SoC may then add (815) the OOBM port and an Ethernet port, into an untagged VLAN, e.g., VLAN E, to facilitate the flow of management Ethernet traffic between the managed switch Ethernet port and the OOBM port, e.g., to bridge ports 364 and 366 in FIG. 3.

In embodiments, the SoC may initialize (820) an UART driver of the dongle, e.g., on port 142 in FIG. 3. SoC may then add (825) the OOBM port to a tagged VLAN (e.g., VLAN C) and instruct (830) a GES to lift up tagged VLAN C packets received at the OOBM port to the SoC core.

In embodiments, for example after initialization process 800, the dongle may handle console output traffic, for example, by performing steps according to a process discussed next with reference to in FIG. 9.

Figure 9:
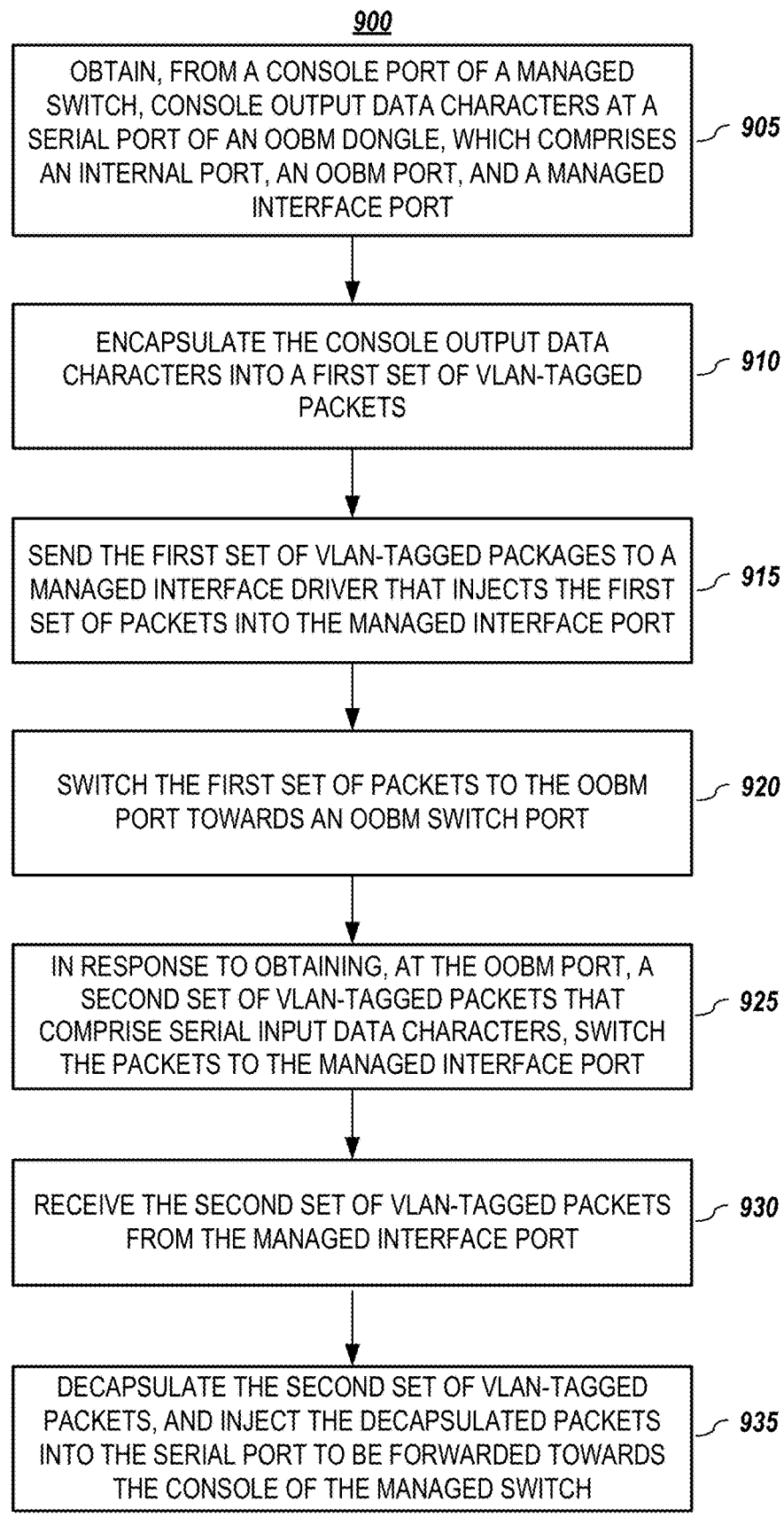
FIG. 9 is a flowchart illustrating console traffic processing according to embodiments of the present disclosure.

FIG. 9 is a flowchart illustrating console traffic processing according to embodiments of the present disclosure. In embodiments, process 900 begins when console output data characters from a console port of a managed switch are obtained (905) at a serial port of an OOBM dongle. In embodiments, the OOBM dongle comprises an internal port attached to the serial port, an OOBM port, and a managed interface port. The console output data characters may be encapsulated (910), e.g., by an UART driver such as driver 604 in FIG. 6, into a first set of VLAN-tagged packets that are sent (915) to a managed interface driver, e.g., managed interface driver 602 in FIG. 6. The managed interface driver injects the first set of packets into the managed interface port. In embodiments, the first set of packets is switched (920) to the OOBM port towards an OOBM switch port.

In embodiments, in response to obtaining, at the OOBM port, a second set of VLAN-tagged packets that comprise serial input data characters, those packets may be switched (925) to the managed interface port. Once the second set of VLAN-tagged packets are received (930) from the managed interface port, they may be decapsulated (935) and injected into the serial port to be forwarded towards the console of the managed switch.

It is noted that: (1) certain steps may optionally be performed; (2) steps may not be limited to the specific order set forth herein; (3) certain steps may be performed in different orders; and (4) certain steps may be done concurrently.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 10:
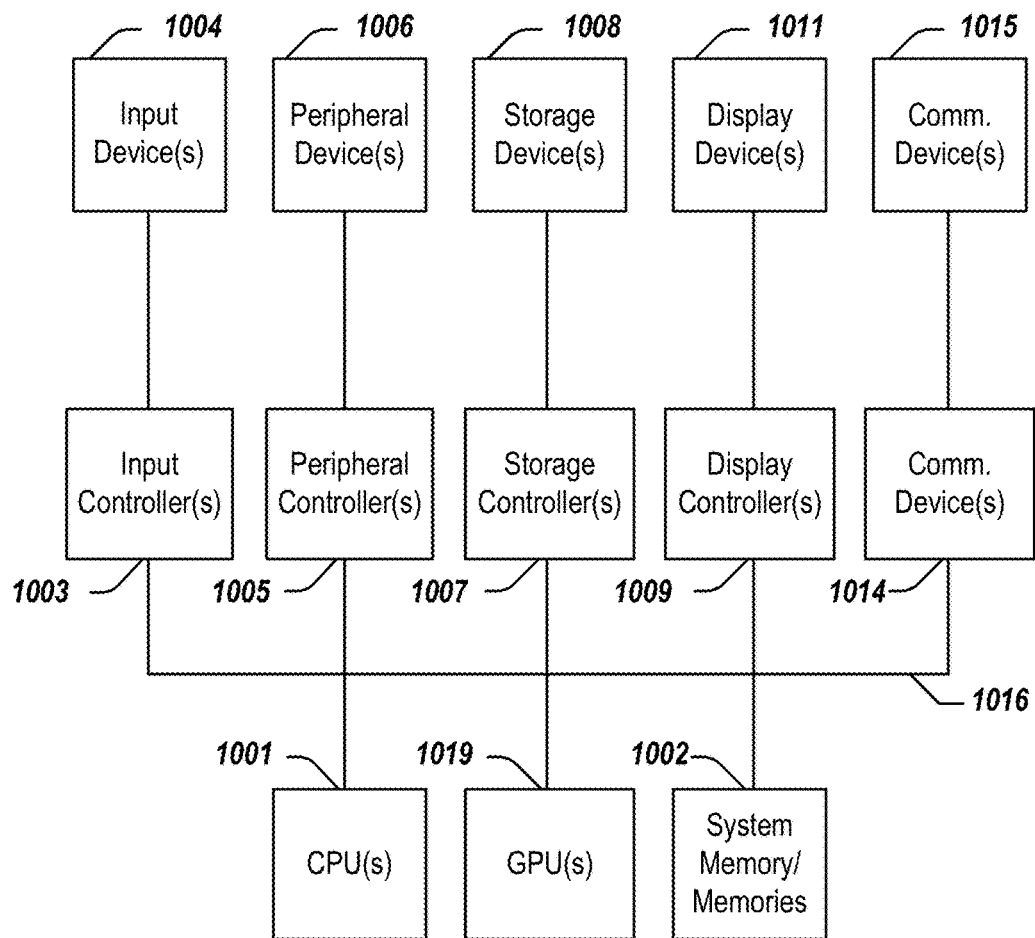
FIG. 10 depicts a simplified block diagram of an information handling system according to embodiments of the present invention.

FIG. 10 depicts a simplified block diagram of an information handling system (or computing system) according to embodiments of the present disclosure. It will be understood that the functionalities shown for system 1000 may operate to support various embodiments of a computing system—although it shall be understood that a computing system may be differently configured and include different components, including having fewer or more components as depicted in FIG. 10.

As illustrated in FIG. 10, the computing system 1000 includes one or more central processing units (CPU) 1001 that provides computing resources and controls the computer. CPU 1001 may be implemented with a microprocessor or the like, and may also include one or more graphics processing units (GPU) 1019 and/or a floating-point coprocessor for mathematical computations. System 1000 may also include a system memory 1002, which may be in the form of random-access memory (RAM), read-only memory (ROM), or both.

A number of controllers and peripheral devices may also be provided, as shown in FIG. 10. An input controller 1003 represents an interface to various input device(s) 1004, such as a keyboard, mouse, touchscreen, and/or stylus. The computing system 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present disclosure. Storage device(s) 1008 may also be used to store processed data or data to be processed in accordance with the disclosure. The system 1000 may also include a display controller 1009 for providing an interface to a display device 1011, which may be a cathode ray tube (CRT), a thin film transistor (TFT) display, organic light-emitting diode, electroluminescent panel, plasma panel, or other type of display. The computing system 1000 may also include one or more peripheral controllers or interfaces 1005 for one or more peripherals 1006. Examples of peripherals may include one or more printers, scanners, input devices, output devices, sensors, and the like. A communications controller 1014 may interface with one or more communication devices 1015, which enables the system 1000 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 11:
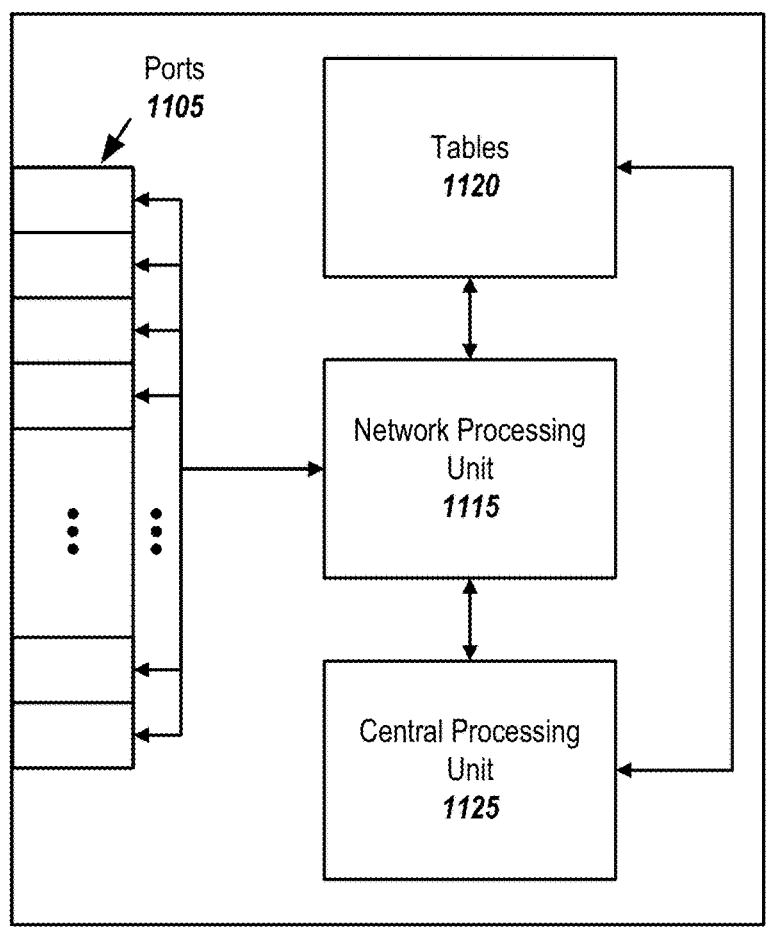
FIG. 11 depicts an alternative block diagram of an information handling system according to embodiments of the present disclosure.

FIG. 11 depicts an alternative block diagram of an information handling system according to embodiments of the present disclosure. It will be understood that the functionalities shown for system 1100 may operate to support various embodiments of the present disclosure—although it shall be understood that such system may be differently configured and include different components (including fewer or more components).

The information handling system 1100 may include a plurality of I/O ports 1105, a network processing unit (NPU) 1115, one or more tables 1120, and a central processing unit (CPU) 1125. The system includes a power supply (not shown) and may also include other components, which are not shown for sake of simplicity.

In one or more embodiments, the I/O ports 1105 may be connected via one or more cables to one or more other network devices or clients. The network processing unit 1115 may use information included in the network data received at the node 1100, as well as information stored in the tables 1120, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An out-of-band management (OOBM) dongle comprising:
   a serial port for receiving console traffic from a console port of a managed switch;
   a managed interface port for receiving management port traffic from a management port of the managed switch, the OOBM dongle uses the console traffic and the management port traffic to generate data traffic; and
   an OOBM port, coupled to the serial port and the managed interface port, the OOBM port communicates the data traffic to an OOBM switch port of an OOBM switch;
   wherein the OOBM dongle performs steps comprising:
      in response to obtaining, from the console port of the managed switch, console output data characters at the serial port of the OOBM dongle, encapsulating the console output data characters into a first set of virtual local area network (VLAN)-tagged packets;
      sending the first set of VLAN-tagged packets to a managed interface driver that injects the first set of VLAN-tagged packets into the managed interface port;
      switching the first set of VLAN-tagged packets to the OOBM port towards an OOBM switch port;
      in response to obtaining, at the OOBM port, a second set of VLAN-tagged packets that comprise serial input data characters, switching the second set of VLAN-tagged packets to the managed interface port; and
      using the managed interface driver to perform steps comprising:
         receiving the second set of VLAN-tagged packets from the managed interface port;
         decapsulating the second set of VLAN-tagged packets to obtain decapsulated packets; and
         injecting the decapsulated packets into the serial port to be forwarded towards the console port of the managed switch.

2. The OOBM system of claim 1, further comprising an OOBM adapter to couple the managed switch to the OOBM dongle, the OOBM adapter comprising:
   a console connector to couple to the console port;
   a serial connector to couple to the serial port;
   a management connector to couple to the management port; and
   an Ethernet connector to couple to the managed interface port.

3. The OOBM system of claim 2, wherein a distance between the console connector and the management connector matches a distance between the console port and the management port, and a distance between the serial connector and the Ethernet connector matches a distance between the serial port and the managed interface port.

4. The OOBM system of claim 2, wherein the OOBM adapter and the OOBM dongle are vertically or horizontally aligned to match an alignment of the management port of the managed switch and the console port of the managed switch.

5. The OOBM system of claim 1, wherein the OOBM dongle generates the data traffic by multiplexing the console traffic and the management port traffic to the OOBM port.

6. The OOBM system of claim 5, wherein the OOBM switch acts as a PSE (Power Sourcing Device), the OOBM dongle acts as a powered device, and the OOBM port is an Ethernet uplink power-over-Ethernet (PoE) port.

7. The OOBM system of claim 1, wherein the OOBM dongle comprises a system-on-chip that comprises:
   a CPU core; and
   a Gigabit Ethernet Switch (GES) comprising a first port to couple to the CPU core, the GES comprising:
      a second port to couple to the managed interface port; and
      a third port to couple to the OOBM port.

8. A processor-implemented out-of-band management (OOBM) method for console traffic processing, the method comprising:
   in response to obtaining, from a console port of a managed switch, console output data characters at a serial port of an OOBM dongle, encapsulating the console output data characters into a first set of virtual local area network (VLAN)-tagged packets, the OOBM dongle comprising a managed interface port and an OOBM port;
   sending the first set of VLAN-tagged packets to a managed interface driver that injects the first set of VLAN-tagged packets into the managed interface port;
   switching the first set of VLAN-tagged packets to the OOBM port towards an OOBM switch port;
   in response to obtaining, at the OOBM port, a second set of VLAN-tagged packets that comprise serial input data characters, switching the second set of VLAN-tagged packets to the managed interface port; and
   using the managed interface driver to perform steps comprising:
      receiving the second set of VLAN-tagged packets from the managed interface port;
      decapsulating the second set of VLAN-tagged packets to obtain decapsulated packets; and
      injecting the decapsulated packets into the serial port to be forwarded towards the console port of the managed switch.

9. The processor-implemented OOBM method according to claim 8, wherein the OOBM switch port identifies the first set of VLAN-tagged packets as console output and maps the first set of VLAN-tagged packets to a reverse telnet console session to access the console port of the managed switch.

10. The processor-implemented OOBM method according to claim 8, further comprising an initialization sequence comprising:
   receiving from a DHCP server that operates on an OOBM switch a tagged Ethernet frame or an IP address that is assigned based on an OOBM switch port of the OOBM switch;

adding the OOBM port and a managed switch Ethernet port to an untagged VLAN to facilitate a flow of management Ethernet traffic;

initializing a console driver on an UART port;

adding the OOBM port to a tagged VLAN; and using a Gigabit Ethernet switch to forward tagged VLAN packets received from the OOBM port to a processor.

11. The processor-implemented OOBM method according to claim 10, further comprising, in response to the processor being energized, initializing a DHCP client on the OOBM port of the OOBM dongle.

12. The processor-implemented OOBM method according to claim 10, wherein the serial port is coupled to a UART (universal asynchronous receiver/transmitter) port of the processor.

13. The processor-implemented OOBM method according to claim 10, further comprising using the IP address from the DHCP server to manage or debug the OOBM dongle.

14. The processor-implemented OOBM method according to claim 10, further comprising using a Gigabit Ethernet switch for bridging packets between the OOBM port and the managed switch.

* * * * *